Jan. 16, 1940.   H. D. STUCK   2,187,504
FUSED JORDAN LINING AND PROCESS OF MAKING
Filed Feb. 4, 1935   3 Sheets-Sheet 1
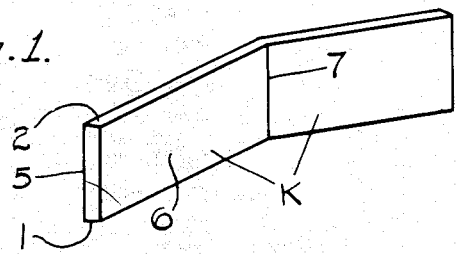
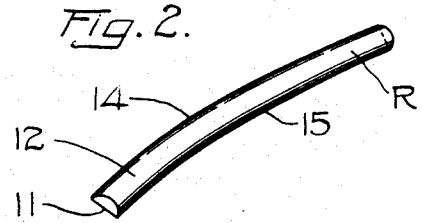
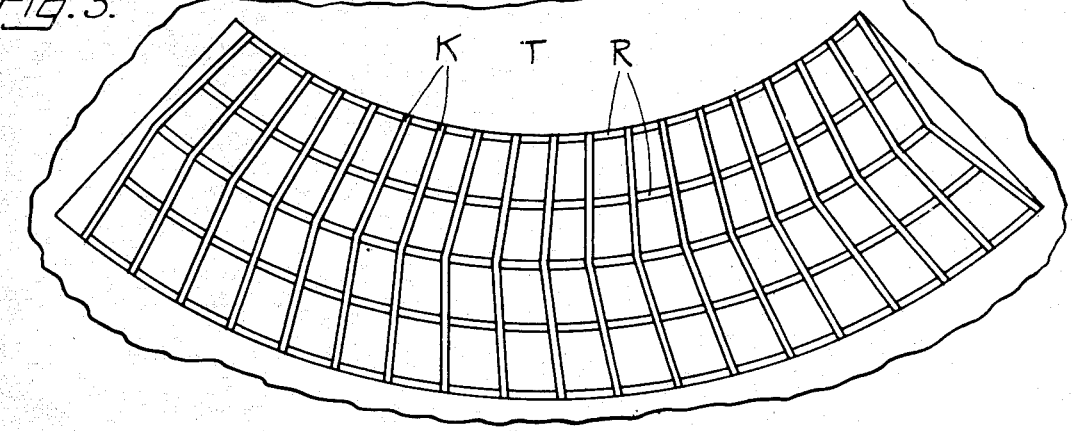
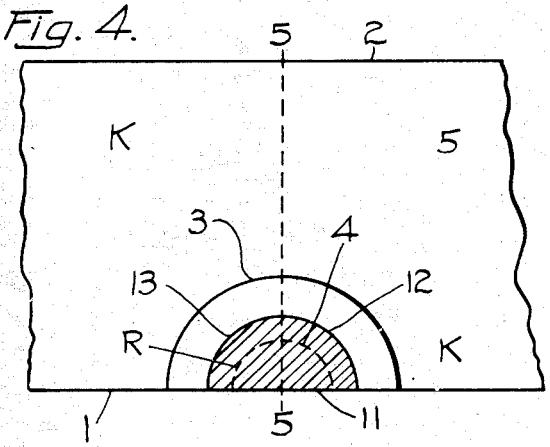
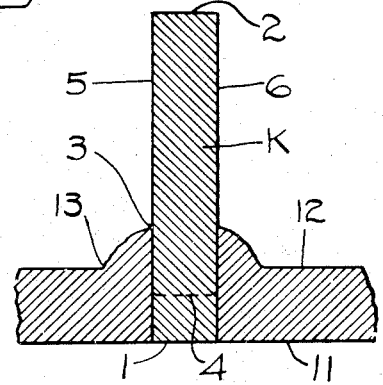
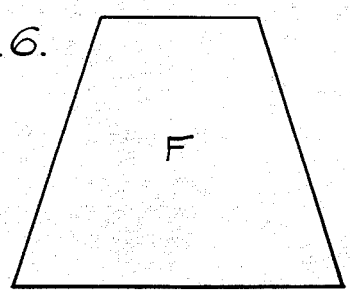
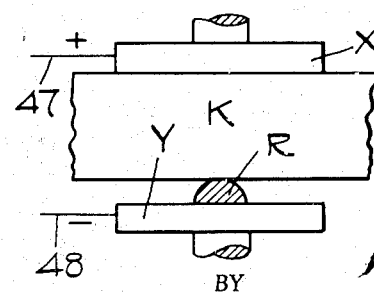
INVENTOR.
Harold D. Stuck
BY
Gardner D. Pearson
ATTORNEY.

Jan. 16, 1940.  H. D. STUCK  2,187,504
FUSED JORDAN LINING AND PROCESS OF MAKING
Filed Feb. 4, 1935  3 Sheets-Sheet 2
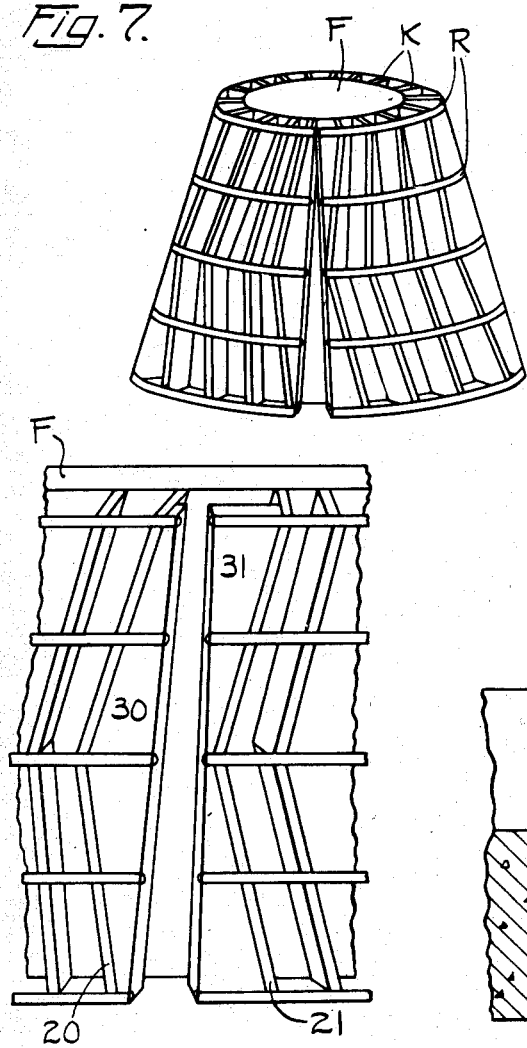
Fig. 7.
Fig. 9.
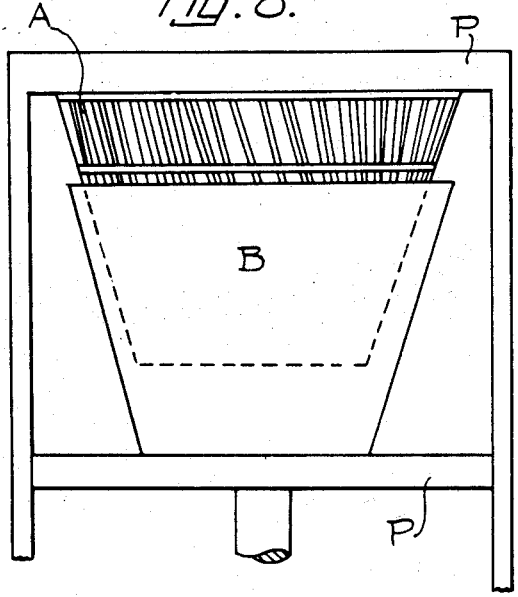
Fig. 8.
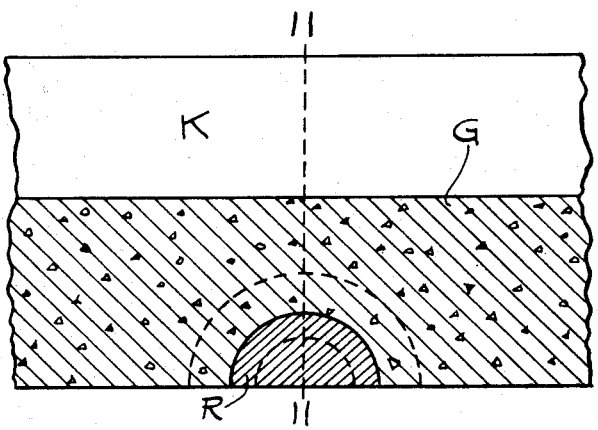
Fig. 10.
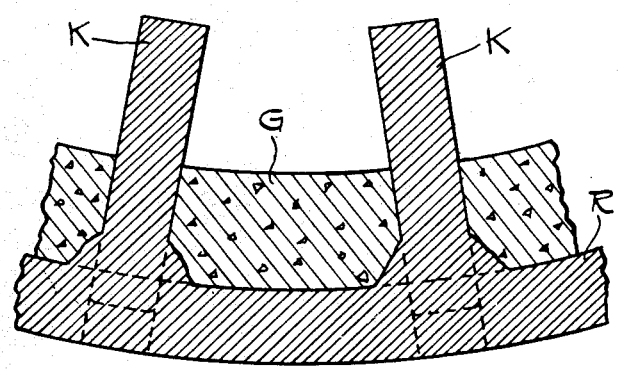
Fig. 11.
INVENTOR.
Harold D. Stuck
BY Gardner W. Pearson
ATTORNEY.

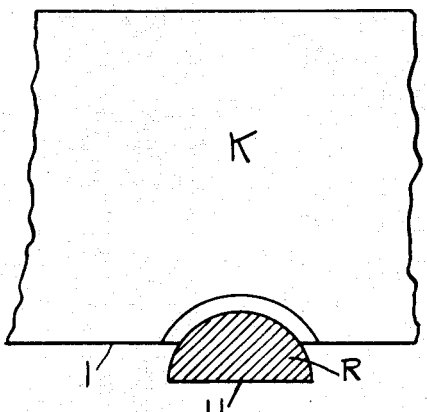
Fig. 12.
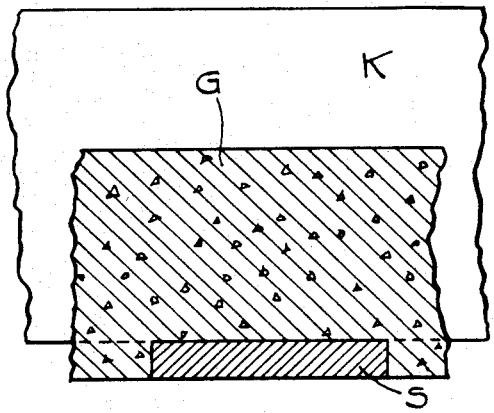
Fig. 13.
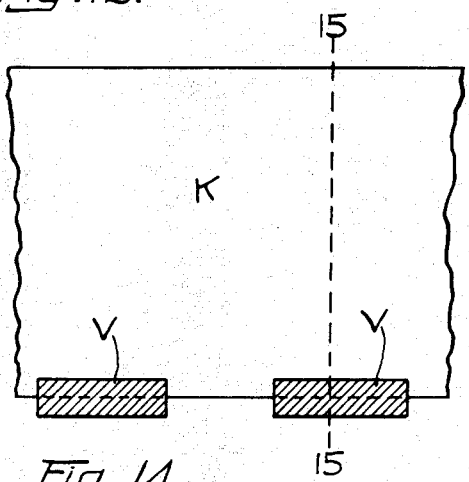
Fig. 14.
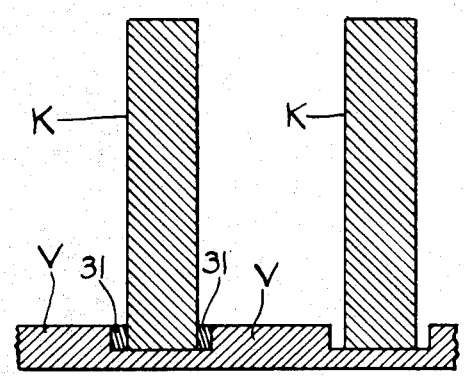
Fig. 15.
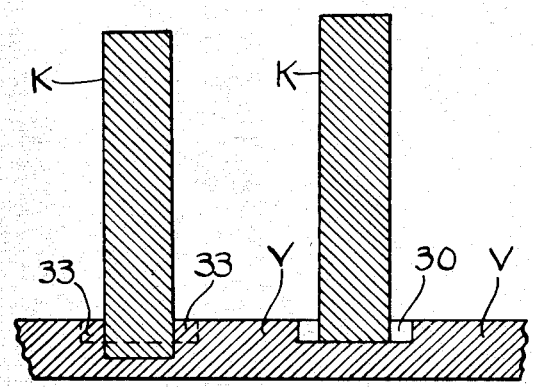
Fig. 16.
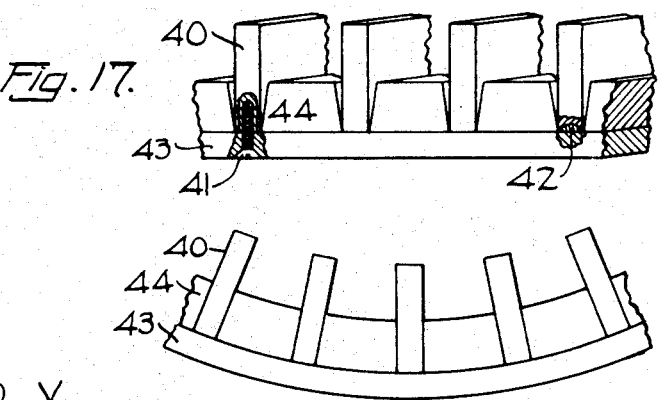
Fig. 17.
Fig. 18.

Patented Jan. 16, 1940

2,187,504

UNITED STATES PATENT OFFICE 2,187,504

FUSED JORDAN LINING AND PROCESS OF MAKING

Harold D. Stuck, Lawrence, Mass., assignor to John W. Bolton & Sons, Inc., Lawrence, Mass., a corporation of Massachusetts Application February 4, 1935, Serial No. 4,850

6 Claims. (Cl. 92—27)

This invention relates to Jordan engines or refining engines used in the treatment of paper stock. It has especial reference to the linings of the stationary shells of such engines. Such engines, their stationary shells and the plug which revolves at great speed inside the shell are of truncated conical form and as the bars of the plug revolve very close to the knives in the shell great accuracy and careful adjustment as well as rigidity or some flexibility are greatly to be desired.

For many years, linings were built up often in several truncated conical subsections by placing in the permanent shell individual knives, angularly bent, separated by wooden separators until a complete circle was made. This process was slow, expensive and difficult so that various preconstructed linings were developed which could be assembled outside the paper mill and introduced as a whole or in several large segments into the fixed shell in the paper mill.

Some of these were built up by stringing the knives and separators on wires such as Abbe, No. 242,286, September 20, 1881, others by holding them together inside a thick or a thin metal jacket like Bolton, No. 1,642,327, September 13, 1927, others held around the periphery by wires, rods and babbitt in grooves such as Martindale, No. 1,494,265 issued May 13, 1924, and still others by various devices which held the separators and knives at their ends.

Another development was the cast filling such as shown by Bahr in his Patent No. 946,752 dated January 18, 1910. In these cast fillings there were no wooden separators as the knives were in the nature of long internal teeth separated on their inner parts by open spaces and held together and kept apart at their outer parts by the integral metal of the casting.

Gloyd in his Patent No. 1,947,644 of February 20, 1934, used metal strips between adjoining knives welded to the sides of the knives intermediate their edges. These strips completely separated the spaces between the inner parts of the knives and the outer parts and in his preferred construction he filled the outer spaces with cement or some similar material. Gloyd also covered the method of assembling which consisted of assembling the parts around a form, holding them in place and then welding the parts together. Such form was naturally of truncated conical form.

It is believed that all known preconstructed fillings are assembled in or outside of a truncated conical jig, form or mould.

In the preferred method of assembling this filling, the parts are fused or welded together on a flat surface and when fused or welded together, the complete assembly or substantially the complete assembly is bent or rolled around a truncated conical form to give it the desired size and shape and preferably is then still further shaped by being forced axially into another form, the inside of which may coincide exactly with the inside of the shell into which the filling is to fit or may be slightly different to allow a certain tolerance if desired.

The metal part of the filling which may be a complete filling is of gridiron or lattice form, the bent knives which are preferably of hard metal running nearly at right angles to the curved ribs which hold them together. The outside edges of these knives are preferably fused and imbedded to a greater or less extent in the ribs or curved metal strips to such an extent that when cool they will stand up rigidly in position. When the ribs with the knives are bent around a truncated conical form, the knives extend from their outer edges to their inner edges in substantially radial planes in the usual manner, the bending strengthening and stiffening their relation to the ribs.

The resulting all metal filling preferably has the knives of hard metal and the ribs of relatively soft metal and their outer edges may coincide or the ribs may project somewhat beyond the knives. Both are suitably heat treated after assembling and the outer parts of the spaces between the knives may be filled with some plastic material such as babbitt, cement or any other substance which resists the action of water.

In the drawings,

Fig. 1 is an isometric view of a Jordan shell knife, and Fig. 2 is an isometric view of a preferred type of rib.

Fig. 3 is a diagram showing how the knives and ribs are assembled prior to, during, and after fusing, before they are rolled up to form a shell filling.

Fig. 4 is a detail view showing a section of a rib with an adjoining knife.

Fig. 5 is a section on line 5—5 of Fig. 4.

Fig. 6 is an elevation of an interior form such as is used in rolling up and shaping the inside of the complete filling.

Fig. 6A is a diagrammatic view of an electric fusing press with the position of a rib and knife at the beginning of the fusing operation, while Figs. 4 and 5 show the position of a rib and knife after the fusing.

Fig. 7 is an isometric view of the filling after ribs and knives have been fused together and the assembly has been rolled around an inside form.

Fig. 8 is an elevation of a press and outside form with the assembly in position ready to have its outside trued and finished.

Fig. 9 is an isometric view showing the check pieces and adjoining parts.

Fig. 10 is a view similar to Fig. 4, but showing a part of the space between the knives and ribs filled with a plastic composition.

Fig. 11 is a vertical sectional view on line 11—11 of Fig. 10.

Fig. 12 is a view similar to Fig. 4, of a modified construction.

Fig. 13 is a view similar to Fig. 10 of another modified construction.

Fig. 14 is a view similar to Fig. 4, another modification.

Fig. 15 is a vertical sectional view on line 15—15 of Fig. 14.

Fig. 16 is a view similar to Fig. 15, showing a variation in the method of fusing or welding.

Fig. 17 is a fragmentary end elevation, partly in section, of a modified construction of an assembly before rolling, and Fig. 18 is an end elevation of the same assembly shown in Fig. 17 as it has been rolled up.

In the drawings, K represents a knife which is preferably of hard metal such as wrought steel and has the outer edge 1, inner edge 2 and the faces 5 and 6 together with the bend at 7, all of the usual type.

R represents a rib preferably of soft metal such as a softer wrought steel which is shown as of half round cross section, the outer face 11 being flat and the inner face 12 being round. A plurality of these ribs or strips R, R suitably bent edgewise from the outer edge 14 to the inner edge 15 are laid with flat face 11 down on a table or other flat surface T and the knives K, K are then altogether or successively placed in the right position with spaces between them which are narrower at one end then at the other and a powerful electric welding current is then passed through the various knives and various ribs accompanied by pressure whereby, as shown in Fig. 4, each knife sinks down into each rib so that its outer edge 1 may coincide exactly with the outer face 11 of a rib. The rib R is reduced in thickness at the point 4, as shown in Figs. 4 and 5, and the knife K is also reduced in height at the same point.

The metal crowded out by the imbedding of the knife in the rib appears between 3 and 13 and helps to maintain each knife rigidly in position.

To unite the ribs and knives, a fusing and welding press, such as shown in Fig. 6A, can be used. This press has top and bottom jaws or members X and Y connected by suitable wires 47 and 48 with a source of electric current, not shown.

When the knives and ribs or strips have been thus fused together, both are heated to approximately 1400° F. and, while still hot and relatively soft, the whole assembly is rolled or bent around a form F shaped as the frustrum of a cone which will coincide approximately with the inside edges of the knives as they will be when the assembled filling is in the fixed shell in the paper mill. This strengthens the union between the knives and ribs.

To further shape the assembly correctly, after cooling, it is again heated to approximately 1400° F. and is then placed in a hollow form B the inside of which is approximately the same size and shape as the inside of the fixed shell in the Jordan engine where it is to go. This form with the assembly A is placed in a very powerful press P and, while still hot, assembly A is forced axially down into form B to properly shape it and it is there allowed to cool. Assembly A is then removed from form B, the ends of the rings are trimmed if necessary and cheek pieces such as 30 and 31 made of metal are welded up against the end knives such as 20 and 21. These cheek pieces permit the usual wedge to be driven in so as to accurately fit a split lining to a permanent shell and to take up any variations in sizes etc.

After being so formed, shaped and finished, the whole assembly is now heated to approximately 1500° F. and quenched in oil, the knives thereby being suitably hardened. If any further shaping or finishing is necessary, the assembly can again be put in the press P or it can be put on a lathe and the outside smoothed and finished as much as is necessary.

The spaces between the strips or ribs and the outer parts of the spaces between the knives can now be filled as with babbitt or other metal of low fusibility or can be filled with cement or any material which can be handled in a plastic or fluid state and which will resist the action of water. Such a material is indicated at G in Figs. 10 and 13.

As shown in Fig. 12, the knives can be sunk or imbedded part way into the ribs so that the outer edges 1, 1 of the knives will not coincide with the outer faces 11, 11 of the ribs or, as shown in Fig. 13, flat strips S can be fused or welded to the outer edges of the knives K, K.

In fact, as shown in Figs. 14 and 15, flat strips V may have lateral grooves a little wider than the knives K and knives K may be imbedded by the use of fusible metal such as 31 or, as shown in Fig. 16, the grooves 30 may be filled with the metal 33 of rib V which is squeezed out as a knife K is forced and fused into it.

In fact, my process may be used in assembling a lining without fusing, as shown in Fig. 17 in which knives 40, 40 are attached by screws 41, 41 or spot welds 42 to a flat backing sheet of metal 43 and then key stone shaped separators 44 are placed between them, after which the assembly may be rolled up cold, shaped and finished as see Fig. 18.

By fused and fuse welded, I mean the process by which two metals are united by both being heated until they are soft or plastic and while still so soft or plastic are driven or pressed together until the two metals are so imbedded one in the other that they are merged, mixed, or blended and are not merely stuck together.

I claim:

1. The method of forming a shell lining for a Jordan engine which consists of fusing the knives to curved ribs both laid flat and of then bending the assembly while heated around a form and of then allowing the assembly to cool.

2. The method of forming a shell lining for a Jordan engine which consists of fusing the knives to curved ribs both laid flat and of then bending the assembly while heated around the outside of a truncated conical form and of then allowing the assembly to cool, and of again heating and forcing the lining from the large end towards the small end of a truncated conical form.

3. The method of forming a shell lining for a Jordan engine which consists of fastening the knives to curved ribs both laid flat and of then bending the assembly around a form.

4. The method of forming a shell lining for a Jordan engine which consists of fastening the knives to a flat backing and of then rolling up the backing and the knives.

5. A truncated conical shell lining for a Jordan engine, comprising a series of radially disposed bent wrought steel knives held together by having their outer edges so fuse welded that they are imbedded in, and are blended with a plurality of curved ribs of softer wrought steel whereby the metal of the ribs is fused to, imbedded in, and blended with the outer edges and sides of the knives, the outer edges of the knives and the outer faces of the ribs lying substantially in the surface of the truncated comb.

6. A truncated conical shell lining for a Jordan engine, comprising a series of radially disposed steel knives, held together by having their outer edges so fused welded that they are imbedded in, and are blended with a plurality of curved ribs of a softer ferrous metal whereby the metal of the ribs is fused to, imbedded in, and blended with the outer edges and sides of the knives, the outer edges of the knives and the outer faces of the ribs lying substantially in the surface of the truncated comb.

HAROLD D. STUCK.